United States Patent
Sansone

(10) Patent No.: US 11,591,162 B2
(45) Date of Patent: Feb. 28, 2023

(54) CONVEYOR SYSTEM FOR MATERIAL TRANSPORT ON COLD PLANER

(71) Applicant: Caterpillar Paving Products Inc., Brooklyn Park, MN (US)

(72) Inventor: Dario Sansone, Castello d'Argile (IT)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 17/354,393

(22) Filed: Jun. 22, 2021

(65) Prior Publication Data

US 2022/0402701 A1     Dec. 22, 2022

(51) Int. Cl.

| | |
|---|---|
| *B65G 15/40* | (2006.01) |
| *B65G 15/30* | (2006.01) |
| *B65G 15/24* | (2006.01) |
| *B65G 15/08* | (2006.01) |
| *B65G 17/24* | (2006.01) |
| *B65G 41/00* | (2006.01) |
| *E01C 23/088* | (2006.01) |

(52) U.S. Cl.
CPC ............ *B65G 17/24* (2013.01); *B65G 15/24* (2013.01); *B65G 15/30* (2013.01); *B65G 41/002* (2013.01); *B65G 41/008* (2013.01); *E01C 23/088* (2013.01); *B65G 2201/045* (2013.01); *B65G 2812/02217* (2013.01)

(58) Field of Classification Search
None
See application file for complete search history.

(56) References Cited

U.S. PATENT DOCUMENTS

| | | | | |
|---|---|---|---|---|
| 4,938,537 A | * | 7/1990 | Rife, Jr. ............... | E01C 23/088 404/90 |
| 5,441,361 A | * | 8/1995 | Campbell ............ | E01C 23/065 404/90 |
| 6,688,450 B2 | * | 2/2004 | Speers ................ | B65G 41/005 198/312 |
| 8,162,132 B2 | | 4/2012 | Muller | |
| 2008/0121495 A1 | | 5/2008 | Pressler et al. | |

FOREIGN PATENT DOCUMENTS

| | | |
|---|---|---|
| CN | 207143698 | 3/2018 |
| GB | 912985 | 12/1962 |
| WO | 0078646 | 12/2000 |

* cited by examiner

*Primary Examiner* — Kavel Singh
(74) *Attorney, Agent, or Firm* — Schwegman, Lundberg & Woessner

(57) ABSTRACT

A conveyor system for a working machines such as a cold planer is disclosed. The working machine that can optionally have a frame, a rotor moveable relative to the frame to remove material from a surface of a working area and the conveyor system. The conveyor system can optionally include a first belt and a second belt. The conveyor system can be positioned to receive loose material from the rotor and transport the loose material relative to the frame away from the rotor. Optionally, the second belt can be positioned adjacent to and extending along the first belt and moveable relative to the frame.

20 Claims, 4 Drawing Sheets

CONVEYOR SYSTEM FOR MATERIAL TRANSPORT ON COLD PLANER

TECHNICAL FIELD

The present disclosure relates generally to a conveyor system and, more particularly, to a conveyor system for a cold planer.

BACKGROUND

Asphalt-surfaced roadways are built to facilitate vehicular travel. Depending upon usage density, base conditions, temperature variation, moisture levels, and/or physical age, the surfaces of the roadways eventually become misshapen and unable to support wheel loads. In order to rehabilitate the roadways for continued vehicular use, spent asphalt is removed in preparation for resurfacing.

Cold planers, sometimes also called road mills or scarifiers, are used to break up and remove layers of an asphalt roadway. A cold planer typically includes a frame propelled by tracked or wheeled drive units. The frame supports an engine, an operator's station, a milling drum or rotor, and conveyors. The milling drum, fitted with cutting tools, is rotated through a suitable interface with the engine to break up the surface of the roadway. The broken up roadway material is deposited by the milling drum onto a conveyor, which transfer the broken up material into haul trucks for removal from the worksite. As haul trucks are filled, they are replaced with empty haul trucks. The filled trucks transport the broken up material to a different location to be reused as aggregate in new asphalt or otherwise recycled. This transport process repeats until the milling process is finished.

With conventional conveyors a continuous belt is positioned over a series of rollers, one or more of which is powered. Flashings can be provided at the lateral edges of the belt to create a seal and prevent material from being dislodged and falling from the belt before reaching the extreme end. These flashings are fixed in place while the belt moves. Examples of such flashings are provided in Great Britain Patent Application Publication 912,985A and U.S. Patent Application Publication No. US20080121495A1. These disclosed flashings are either fixed or can configured to be repositioned (e.g., deflected or tilted) relative to the belt if desired.

While the flashings of these publications are effective in containing material, they have drawbacks. In particular, the moving nature of the main belt along with the fixed nature of the flashings creates wear of the flashing over time. Eventually this can impact the effectiveness of the seal created by the flashings with the main belt.

The conveyor system of the present disclosure solves one or more of the problems set forth above and/or other problems in the art.

SUMMARY

In one example, the present disclosure is related to working machine that can optionally have a frame, a rotor moveable relative to the frame to remove material from a surface of a working area and a conveyor system. The conveyor system can optionally include a first belt and a second belt. The conveyor system can be positioned to receive loose material from the rotor and transport the loose material relative to the frame away from the rotor. Optionally, the second belt can be positioned adjacent to and extending along the first belt and moveable relative to the frame.

In another example, the present disclosure is related to a material transportation system. The material transportation system can include a first belt, a second belt and a third belt. The first belt can be positioned to receive loose material and transport the loose material. The second belt can be positioned adjacent to and can extend along the first belt. The second belt can be movable with the first belt. The third belt can be positioned on an opposing lateral side on the first belt from the second belt. The third belt can be movable with the first belt and the second belt. The second belt and the third belt can be configured as flashings to retain the loose material on the first belt.

In yet another example, the present disclosure is directed to a method of milling and transporting loose material on a working machine. The method can include milling a work surface to create a loose material and transferring the loose material to a conveyor system of the working machine. The conveyor system can include at least a primary belt and a secondary belt. The method can optionally include driving the primary belt and the secondary belt at substantially a same speed relative to one another to transport the loose material using the primary belt and the secondary belt.

DETAILED DESCRIPTION

For the purpose of this disclosure, the term "substantially" means between 0% and ±15% thereof, inclusive. Thus, substantially can include exactly a same amount (e.g., a speed). The term "asphalt" is defined as a mixture of aggregate and asphalt cement. Asphalt cement is a brownish-black solid or semi-solid mixture of bitumens obtained as a byproduct of petroleum distillation. The asphalt cement can be heated and mixed with the aggregate for use in paving roadway surfaces, where the mixture hardens upon cooling. A "cold planer" is defined as a machine used to remove layers of hardened asphalt from an existing roadway. It is contemplated that the disclosed cold planer may also or alternatively be used to remove cement and other roadway surfaces, or to remove non-roadway surface material such as in a mining operation. It is also contemplated the disclosed conveyor system can be used with other working vehicles that utilize conveyors for loose material such as crushers, trenchers, asphalt millers, or the like. Furthermore, the conveyor system disclosed herein is not limited to working vehicles but can be utilized in plant, mining or other environments where it is not part of a vehicle.

Figure 1:
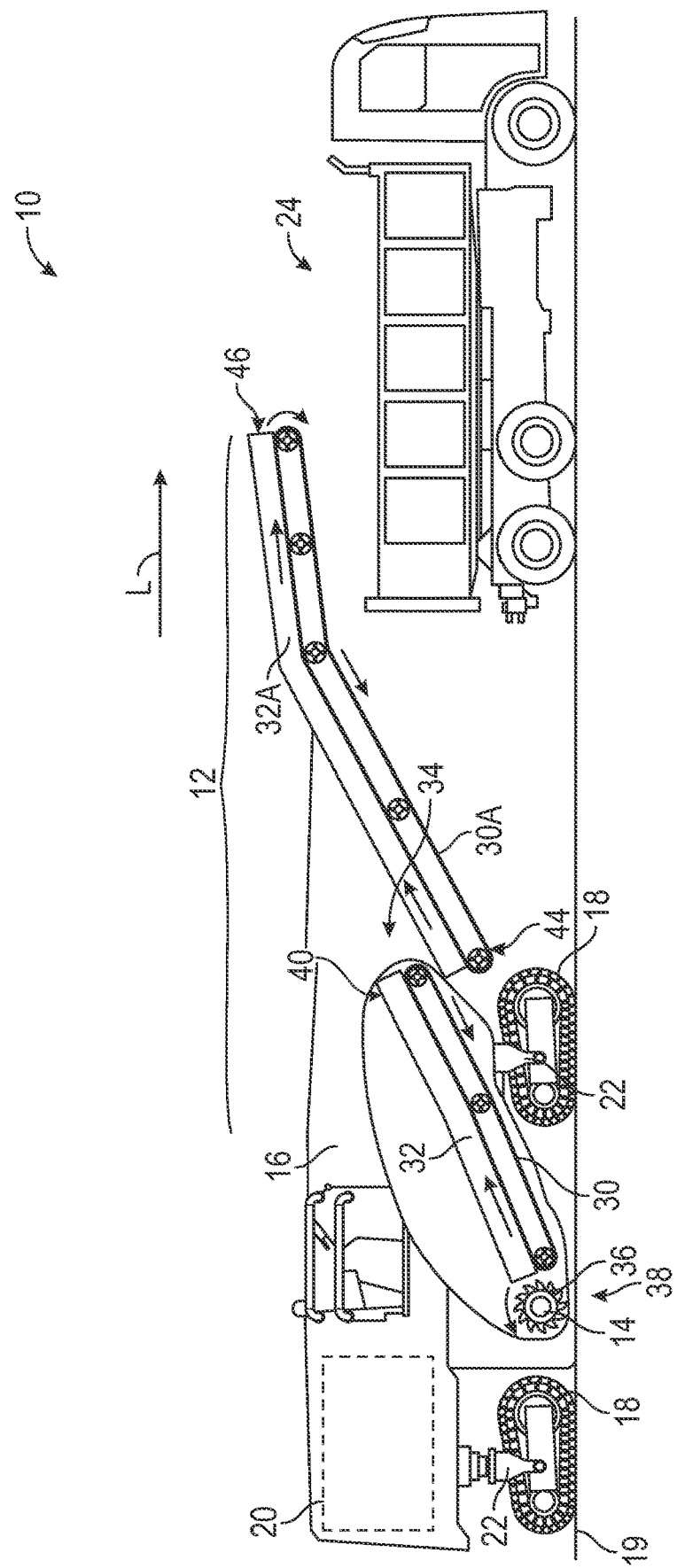
FIG. 1 is a highly schematic view of an exemplary worksite with a cold planer having a conveyor system.

FIG. 1 shows an exemplary cold planer 10 having a conveyor system 12 associated with a rotor 14 (sometimes called a milling drum) for milling. Cold planer 10 may include a frame 16 supported by one or more transport devices 18, and a frame-mounted engine 20 configured to drive the rotor 14, and the one or more transport devices 18. The one or more transport devices 18 may include either wheels or tracks connected to lifting columns 22 that are adapted to controllably raise and lower the frame 16 (and the rotor 14) relative to a ground surface 19. The conveyor system 12 may be connected at a leading end to frame 16 and configured to transport loose material away from the rotor 14, along the frame 16 and into a waiting haul vehicle 24.

The conveyor system 12 may include various components that cooperate to remove broken up asphalt and/or other material (simply termed "loose material" herein) from the rotor 14. Specifically, the conveyor system 12 may include a first primary conveyor 30, a first secondary conveyor 32, a second primary conveyor 30A, a second secondary conveyor 32A and a transition area 34, The transition area 34 can be located between the first primary conveyor 30 and the second primary conveyor 30A.

A plurality of cutting tools 36 can be connected to an outer periphery of rotor 14. These can be configured to deliver loose material onto a charge end 38 of the first primary conveyor 30 and/or first secondary conveyor 32 as the rotor 14 rotates towards the first primary conveyor 30 and first secondary conveyor 32. As the loose material exits a discharge end 40 of the first primary conveyor 30 and/or first secondary conveyor 32, the loose material may fall directly onto the second primary conveyor 30A and/or second secondary conveyor 32A. However, the loose material can also strike against a weldment or other structure located within the transition area 34 according to other embodiments. The first primary conveyor 30, the first secondary conveyor 32 and the transition area 34 can be an enclosed box-like structure (removed for reference in FIG. 1). The loose material may can fall onto a charge end 44 of second primary conveyor 30A. The second primary conveyor 30A and/or the second secondary conveyor 32A may discharge the milled asphalt into haul vehicle 24 from a discharge end 46. In the disclosed embodiment, the second primary conveyor 30A and/or second secondary conveyor 32A can be capable of moving side-to-side and up-and-down to facilitate the discharge of milled asphalt into the haul vehicle 24. It is contemplated, however, that the second primary conveyor 30A and/or second secondary conveyor 32A could be non-pivotable if desired.

The first secondary conveyor 32 can be positioned adjacent the first primary conveyor 30 and can extend generally adjacent thereto in a longitudinal direction L. Similarly, the second secondary conveyor 32A can be positioned adjacent the second primary conveyor 30A and can extend generally adjacent thereto in the longitudinal direction L. As further discussed herein, the first secondary conveyor 32 and the first primary conveyor 30 can be configured to form a seal, can transport the loose material in tandem and can perform other operations as discussed herein. Similarly, the second secondary conveyor 32A and the second primary conveyor 30A can be configured to form a seal, can transport the loose material in tandem and can perform other operations. The first secondary conveyor 32 can be moveable relative to the frame 16, for example. Such movement can be with the first primary conveyor 30, for example, such as at substantially a same relative speed thereto. Similarly, the second secondary conveyor 32A can be moveable relative to the frame 16, for example. Such movement can be with the second primary conveyor 30A, for example, such as at substantially a same relative speed thereto.

Figure 2A:
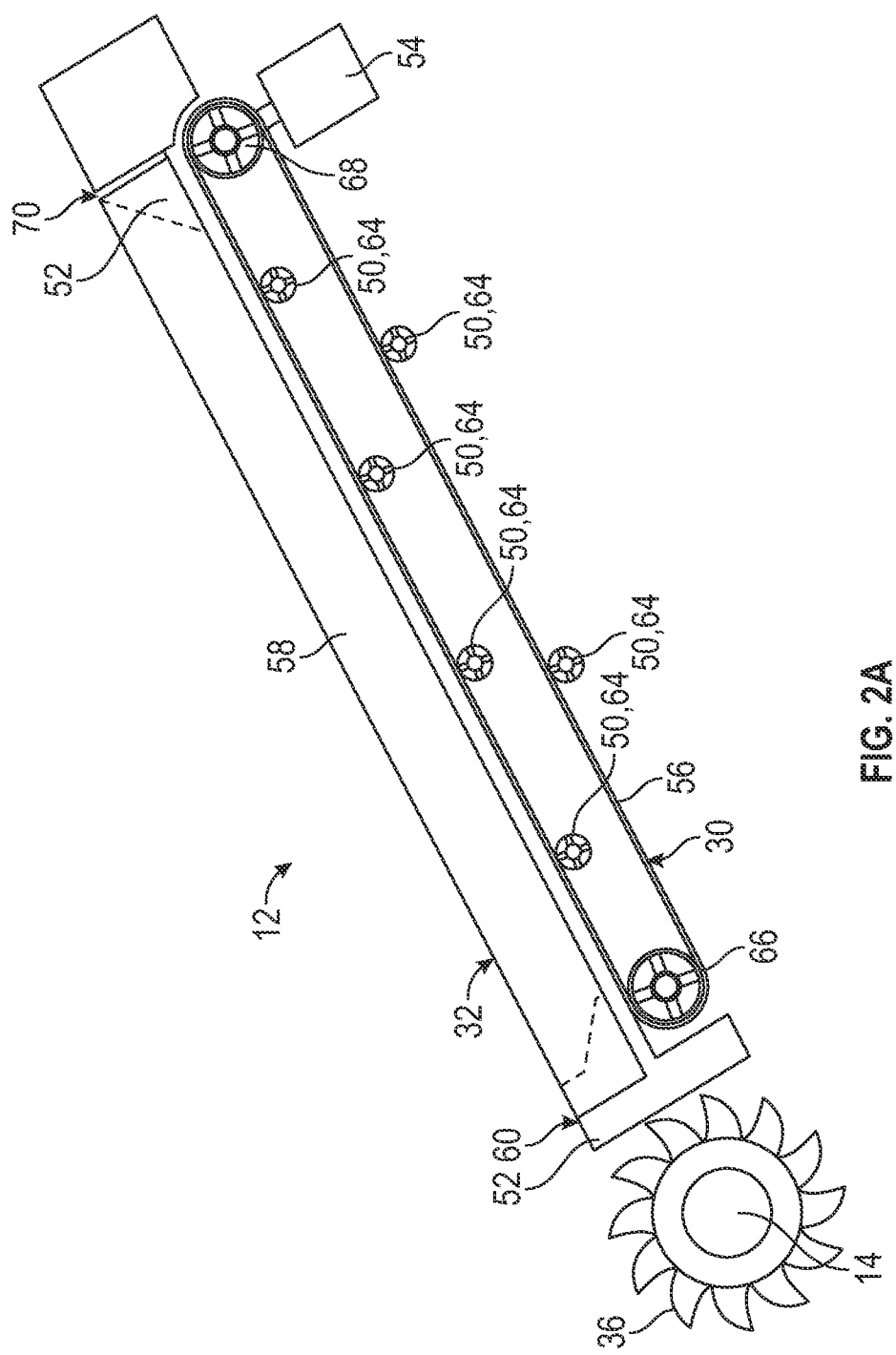
FIG. 2A is a side view of part of the conveyor system of FIG. 1.

FIG. 2A is a side view of a part of the conveyor system 12 comprising the first primary conveyor 30 and the first secondary conveyor 32. It is recognized the concepts, techniques and constructs of the present description can apply to other parts of the conveyor system 12 such as the second primary conveyor 30A and second secondary conveyor 32A of FIG. 1 in addition to or in alternative to those illustrated.

In addition to the first primary conveyor 30 and the first secondary conveyor 32, the conveyor system 12 can include a plurality of belts 48, a plurality of rollers 50, flashings 52 and a drive 54. The plurality of belts 48 can include a first belt 56 for the first primary conveyor 30 and a second belt 58 for the first secondary conveyor 32.

The first belt 56 and the second belt 58 can be moveably retained on and driven by the plurality of rollers 50 to transport the loose material in the longitudinal direction. The first belt 56 and the second belt 58 can be a continuous ring and can be formed of polymer, rubber or other elastic material as known in the art. The first belt 56 and the second belt 58 can be positioned adjacent one another and can extend generally longitudinally with one another. The first belt 56 and the second belt 58 can be configured to form a seal and can transport the loose material in tandem. The first belt 56 and second belt 58 can be moveable via the plurality of rollers 50, for example. Movement of the first belt 56 can be at a substantially a same relative speed as the second belt 58, for example. However, in some examples the speeds of the first belt 56 and the second belt 58 can differ somewhat. However, it is contemplated herein that the second belt 58 is moveable and does not comprise a flashing.

FIG. 2A additionally shows the rotor 14 with the cutting tools 36 as previously discussed. The rotor 14 can be positioned adjacent and in close proximity to first longitudinal ends 60 (i.e., charge end 38) of the first belt 56 and the second belt 58. The first of the flashings 52 can comprise metal or other material fixedly positioned adjacent the rotor 14, the first belt 56 and the second belt 58. The first of the flashings 52 can be configured to capture and direct the loose material from the rotor 14 onto the first longitudinal ends 60 of the first belt 56 and/or the second belt 58 for transport thereby.

Figure 2B:
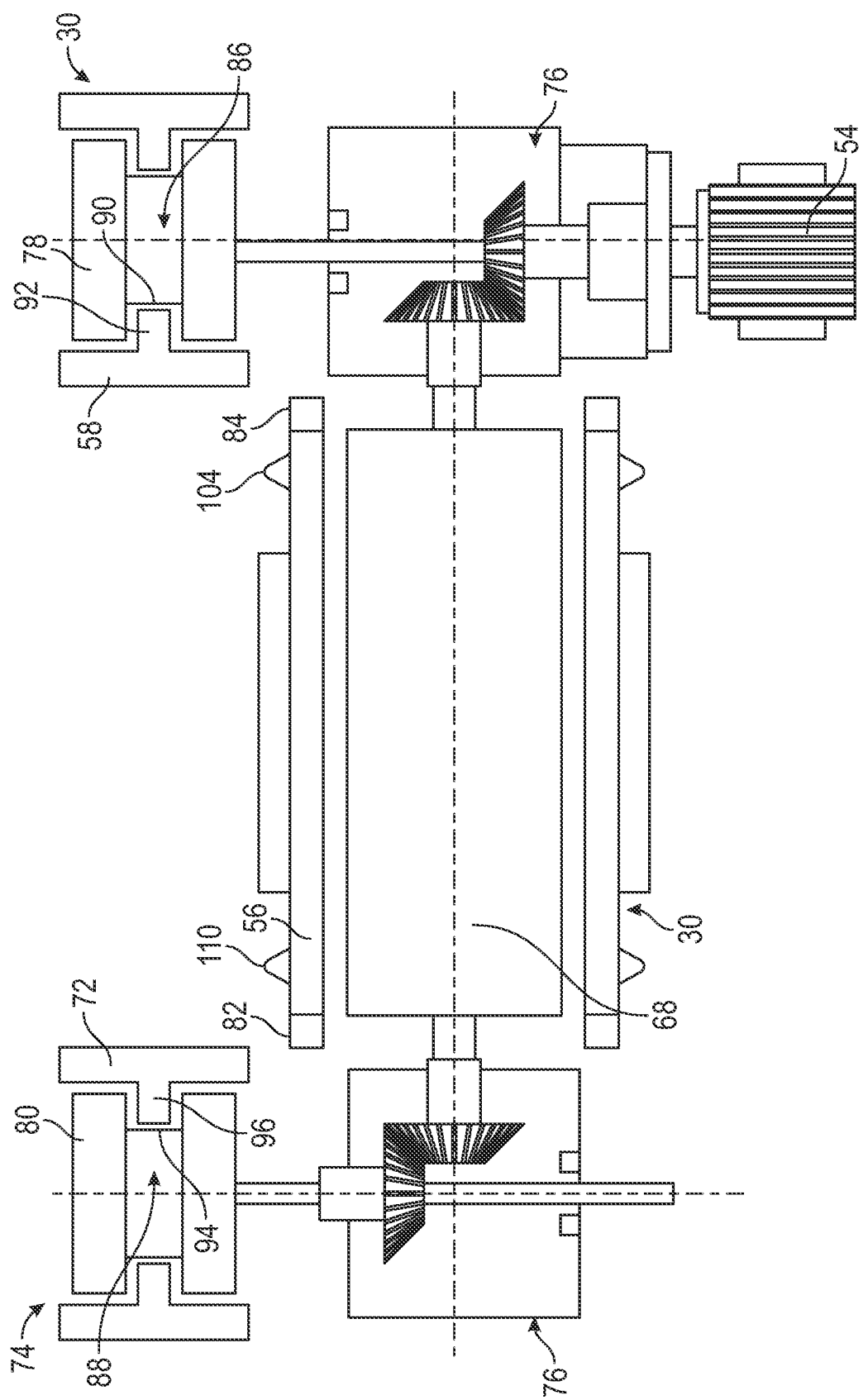
FIG. 2B is a first cross-sectional view of the part of the conveyor system through a plane substantially transverse to that of FIG. 2.
Figure 2C:
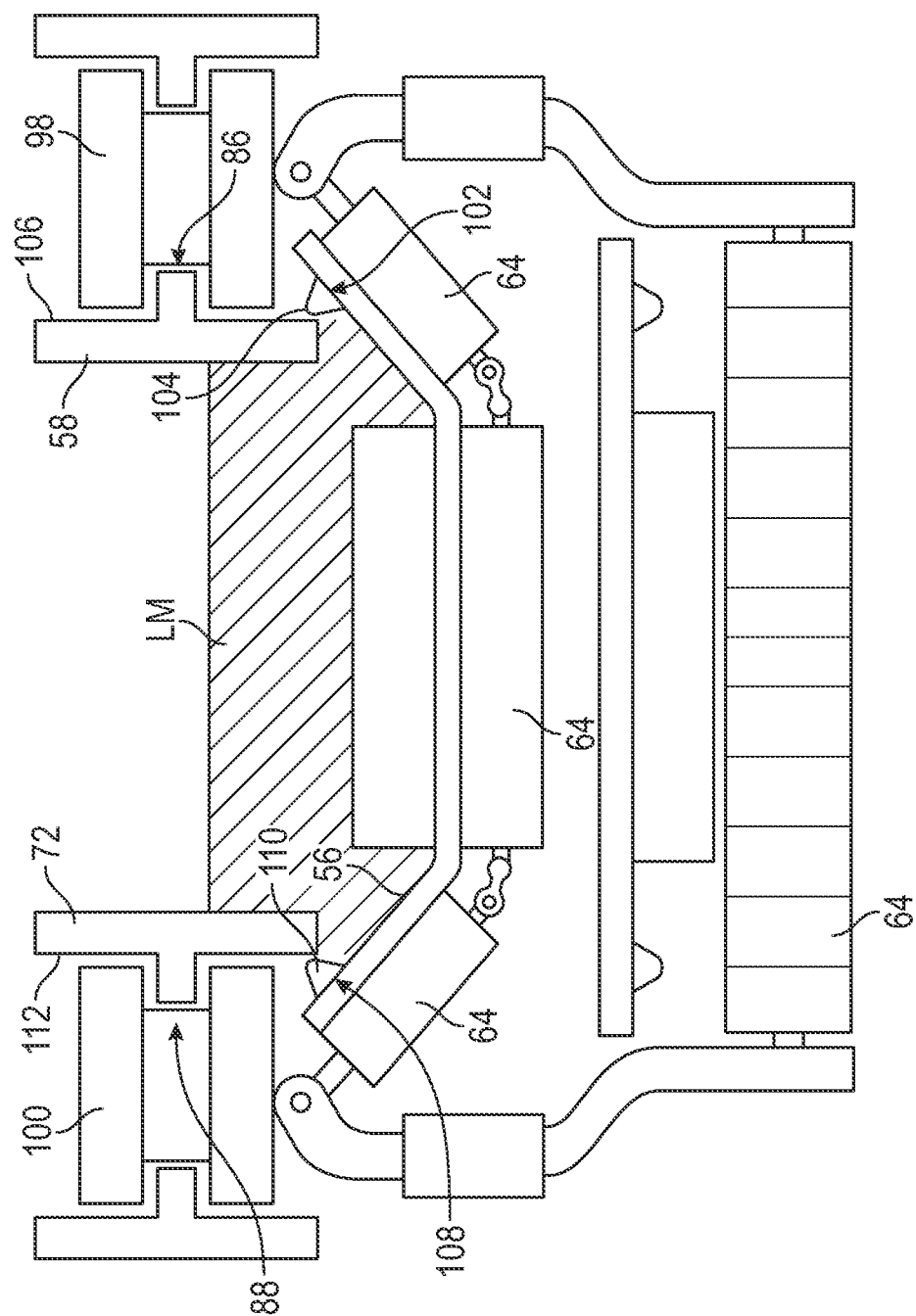
FIG. 2C is a second cross-sectional view of the part of the conveyor system through a plane substantially transverse to that of FIG. 2.

The plurality of belts 48 (i.e., the first belt 56 and the second belt 58) can be supported by and driven by the plurality of rollers 50. For simplicity, only the plurality of rollers 50 for the first primary conveyor 30 are shown in FIG. 2A. However, it is recognized the plurality of rollers 50 can be utilized with the first secondary conveyor 32 as shown in FIGS. 2B and 2C. The plurality of rollers 50 can include main rollers 62 and a plurality of support rollers 64. The main rollers 62 can include a return roller 66 at or adjacent the first longitudinal ends 60 and a drive roller 68 adjacent second longitudinal ends 70 (i.e., discharge end 40) of the first belt 56 and second belt 58.

The drive roller 68 and/or return roller 66 can be coupled to the drive 54 via shafts, gearing and/or other mechanisms as known in the art. The drive 54 can be a hydraulic, pneumatic or electric motor, for example. However, it is contemplated the drive 54 can the frame-mounted engine 20 of FIG. 1 according to some examples. The rotational speed of drive 54 can be adjustable so as to regulate a transport speed of the material carried by the plurality of belts 48. In the disclosed example, the transport speed of first belt 56 and/or second belt 58 can be automatically adjustable (via rotational speed adjustment of drive 54) based on one or more operational characteristics of the cold planer 10 (e.g., engine speed, the travel speed, steering, milling drum depth, milling drum speed, milling drum torque, etc.). Furthermore, the transport speed of the first belt 56 and/or second belt 58 can be independently and directly adjustable based on operator input.

A second of the flashings 52 can be located at or adjacent the second longitudinal ends 70 of the first belt 56 and the second belt 58. This second of the flashings 52 can be part of the transition area 34 as previously discussed. The second of the flashings 52 can be configured to capture and direct the loose material at the second longitudinal ends 70 for either further transport with the second primary conveyor 30A and second secondary conveyor 32A of FIG. 1 or with a truck, for example.

FIG. 2B shows a cross-sectional view through the second longitudinal ends 70, the drive 54 and the drive roller 68. As shown in FIG. 2B, the conveyor system 12 can include a third belt 72 that can be part of a third conveyor assembly 74. It is contemplated then rather than having a separate conveyor and third belt the second belt 58 could extend around the first belt 56 in a convoluted pathway to provide for a side belt. It is also contemplated that the third belt 72 is not required in all examples. Rather, a fixed flashing could be substituted for the third belt 72 in some cases.

FIG. 2B shows many of the components previously discussed in reference to FIG. 2A including the first primary conveyor 30, the first secondary conveyor 32, the drive 54, first belt 56, second belt 58 and the drive roller 68. FIG. 2B additionally shows coupling mechanisms 76 (e.g., gears, shafts, mechanical linkages, or the like) and drive rollers 78 and 80. As shown in FIG. 2B the first belt 56, the second belt 58 and the third belt 72 are transporting an amount of loose material to the second longitudinal ends 70.

As shown in FIG. 2B, the second belt 58 can be oriented substantially transverse to the first belt 56. This can orient the second belt 58 substantially vertically, for example. Similarly, the third belt 72 can be oriented substantially transverse to the first belt 56. This can orient the third belt 72 substantially vertically, for example. The third belt 72 can be positioned adjacent a first lateral edge 82 of the first belt 56. The second belt 58 can be positioned adjacent a second lateral edge 84 of the first belt 56. Thus, the second belt 58 and the third belt 72 can be positioned adjacent opposing lateral sides of the first belt 56.

The drive 54 can be coupled via the coupling mechanisms 76 to the drive roller 68 and drive rollers 78 and 80. In this manner, the drive roller 68 can be driven with the drive rollers 78 and 80 such that all of the drive rollers 68, 78 and 80 can drive the first belt 56, the second belt 58 and the third belt 72 at substantially a same peripheral speed as one another. The first belt 56 can be driven for movement by the drive roller 68 as shown. The second belt 58 can be driven for movement by the drive roller 78. The third belt 72 can be driven for movement by the drive roller 80. Further support rollers such as the support rollers 64 (FIG. 2A) are contemplated for use with the second belt 58 and the third belt 72 and some are illustrated in FIG. 2C. Although the drive 54 is shown as powering all of the drive rollers 68, 78 and 80 in FIG. 2B, an additional drive or drives independent of the drive 54 can be used to separately power the drive rollers 68, 78 and/or 80 according to some examples. Furthermore, coupling mechanism 76 could be configured so as to drive some of the drive rollers 68, 78, and/or 80 at different speeds relative to one another should that be desired.

In the example of FIG. 2B, the drive roller 78 and the second belt 58 can each include a mating feature 86. This mating feature 86 can facilitate retention of the second belt 58 on the drive roller 78. As shown the mating feature 86 can comprise a groove 90 on the drive roller 78 and a tongue projection 92 on a back side of the second belt 58. However, this combination can be reversed or other features to facilitate mating are contemplated. Support rollers (not shown) can include the mating feature 86 according to some examples.

Similarly, the drive roller 80 and the third belt 72 can each include a mating feature 88. This mating feature 88 can facilitate retention of the third belt 72 on the drive roller 80, As shown the mating feature 88 can comprise a groove 94 on the drive roller 78 and a tongue projection 96 on a back side of the second belt 58. However, this combination can be reversed or other features to facilitate mating are contemplated. Support rollers (not shown) can include the mating feature 88 according to some examples.

As previously discussed, the first belt 56 and second belt 58 can be moveable via the drive rollers 68 and 78 as well as other rollers not shown, for example. Movement of the first belt 56 can be at a substantially a same relative speed as the second belt 58, for example. However, in some examples the speeds of the first belt 56 and the second belt 58 can differ somewhat. However, it is contemplated herein that the second belt 58 is moveable and does not comprise a flashing. Similarly, the first belt 56 and third belt 72 can be moveable via the drive rollers 68 and 80 as well as other rollers not shown, for example. Movement of the first belt 56 can be at a substantially a same relative speed as the third belt 72, for example. However, in some examples the speeds of the first belt 56 and the third belt 72 can differ somewhat. As discussed, third belt 72 can be a flashing (i.e., not moveable) according to further examples.

FIG. 2C shows cross-sectional view through a central section of the first belt 56, the second belt 58 and the third belt 72. FIG. 2C shows two of the plurality of support rollers 64 for the first belt 56. FIG. 2C additionally shows a first support roller 98 for the second belt 58 and a second support roller 100 for the third belt 72. As shown in FIG. 2C the first support roller 98 and the second support roller 100 can include the mating features 86, 88 as previously described in FIG. 2B. As shown in FIG. 2C the first belt 56, the second belt 58 and the third belt 72 are transporting an amount of loose material LM. The second belt 58 and the third belt 72 can act to retain the loose material LM on the first belt 56.

The first belt 56 and the second belt 58 can be configured to form a seal 102 and can transport the loose material in tandem. The seal 102 can prevent or discourage the loose material LM from exiting the conveyor system 12. This can be accomplished by at least one ridge or projection 104 on a main surface of the first belt 56. This at least one ridge or projection 104 can be positioned on a rear side 106 of the second belt 58 as shown in FIG. 2C. This arrangement creates a labyrinth type seal between the first belt 56 and the second belt 58.

Similarly, the first belt 56 and the third belt 72 can be configured to form a seal 108 and can transport the loose material in tandem. The seal 108 can prevent or discourage the loose material LM from exiting the conveyor system 12. This can be accomplished by at least one ridge or projection 110 on a main surface of the first belt 56. This at least one ridge or projection 110 can be positioned on a rear side 112 of the third belt 72 as shown in FIG. 2C. This arrangement creates a labyrinth type seal between the first belt 56 and the third belt 72. The at least one ridge or projections 104 and 110 are also shown in FIG. 2B.

INDUSTRIAL APPLICABILITY

The present application discusses conveyor systems such as conveyor system 12 that can be utilized with to transport loose materials such as those that occur when utilizing a working machine such as the cold planer 10. The present application contemplates the use of a secondary conveyor (e.g., first secondary conveyor 32 and/or second secondary conveyor 32A) that can work with a main conveyor to transport the loose material. The first primary conveyor 30 can include the first belt 56 while the first secondary conveyor 32 can include the second belt 58. The second belt 58 can be moveable (i.e., is not a stator flashing). The second belt 58 can be moveable at substantially a same relative speed as the first belt 56. The present application contemplates use of the third belt 72 in addition to the first belt 56 and the second belt 58. The third belt 72 can be moveable such as at substantially the same relative speeds as that of the first belt 56 and the second belt 58.

The present application further contemplates the first belt 56 and the second belt 58 can be configured to form the seal 102 and can transport the loose material in tandem. The seal 102 can prevent or discourage the loose material from exiting the conveyor system 12. This can be accomplished by the at least one ridge or projection 104 on the main surface of the first belt 56. The at least one ridge or projection 104 can be positioned on the rear side 106 of the second belt 58 to create a labyrinth type arrangement as discussed. A similar seal 108 can be utilized between the third belt 72 and the first belt 56.

Several advantages may be associated with the disclosed conveyor system 12. For example, providing for a moveable secondary belt (e.g., second belt 58 and/or third belt 72) can reduce wear between the first belt 56 and the secondary belt that would have occurred were a stator flashing utilized as in conventional conveyor systems. Wear can reduce the effectiveness of a seal created between the flashing and the first belt 56 over time. Furthermore, wear can necessitate repair or replacement of the flashing and/or the first belt 56. Thus, with reduced wear repair and replacement cost and conveyor system downtime can be reduced. Additionally, another advantage of the present application is that because the secondary belt (e.g., second belt 58 and/or third belt 72) it can be utilized to assist the first belt 56 in the transport of the loose material. With a stator flashing, the loose material can drag along lateral edges of the first belt 56. This creates wear as discussed above and additionally reduces the volume flow rate of the loose material along the first belt. With moveable secondary belt(s), this drag can be reduced or eliminated such that higher volume throughput rates for loose material along the conveyor system 12 are thus achievable.

It will be apparent to those skilled in the art that various modifications and variations can be made to the disclosed management system without departing from the scope of the disclosure. Other embodiments of the management system will be apparent to those skilled in the art from consideration of the specification and practice of the management system disclosed herein. It is intended that the specification and examples be considered as exemplary only, with a true scope of the disclosure being indicated by the following claims and their equivalents.

What is claimed is:

1. A working machine comprising
a frame;
a rotor moveable relative to the frame to remove material from a surface of a working area; and
a conveyor system positioned to receive loose material from the rotor and transport the loose material relative to the frame away from the rotor, wherein the conveyor system includes:
a first belt; and
a second belt positioned adjacent to a lateral side and extending along the first belt and moveable relative to the frame.

2. The working machine of claim 1, wherein the second belt is moveable with the first belt, and wherein the first belt and the second belt move at a substantially same speed relative to one another.

3. The working machine of claim 1, wherein the second belt is driven to transport the loose material in combination with the first belt.

4. The working machine of claim 1, wherein the first belt includes a feature configured to create a seal between the first belt and the second belt.

5. The working machine of claim 4, wherein the feature comprises a ridge.

6. The working machine of claim 1, wherein the conveyor system includes a plurality of rollers that support the second belt, wherein the second belt and the plurality of rollers include one or more mating features to retain the second belt on the plurality of rollers.

7. The working machine of claim 6, wherein the one or more mating features comprise at least one groove and at least one projection.

8. The working machine of claim 1, wherein at least the second belt comprises a continuous ring of elastic material.

9. The working machine of claim 1, wherein the conveyor system includes a third belt positioned adjacent to the first belt and movable relative to the frame, wherein the second belt and the third belt are positioned adjacent opposing lateral sides of the first belt, and wherein the second belt and the third belt act to retain the loose material on the first belt.

10. The working machine of claim 9, wherein the conveyor system includes a plurality of drive rollers that are coupled together for driven movement of the first belt, the second belt, and the third belt with one another.

11. A material transportation system comprising:
a first belt positioned to receive loose material and transport the loose material;
a second belt positioned adjacent to a lateral side and extending along the first belt, wherein the second belt is movable with the first belt, and
a third belt positioned on an opposing lateral side of the first belt from the second belt, wherein the third belt is movable with the first belt and the second belt, and wherein the second belt and the third belt are configured as flashings to retain the loose material on the first belt.

12. The system of claim 11, wherein the second belt and the third belt move at substantially a same relative speed as the first belt.

13. The system of claim 11, wherein the second belt and the third belt are driven to transport the loose material in combination with the first belt.

14. The system of claim 11, further comprising a plurality of drive rollers that are coupled together for driven movement of the first belt, the second belt, and the third belt with one another.

15. The system of claim 11, wherein the first belt includes at least a first feature configured to create a first seal between the second belt and the first belt and the first belt includes at least a second feature configured to create a second seal between the third belt and the first belt.

16. The system of claim 11, further comprising a plurality of rollers configured to support the second belt, wherein the second belt and the plurality of rollers include one or more mating features to retain the second belt on the plurality of rollers.

17. A method of milling and transporting loose material on a working machine, comprising:
- milling a work surface to create a loose material;
- transferring the loose material to a conveyor system of the working machine, wherein the conveyor system includes at least a primary belt and a secondary belt wherein the secondary belt is positioned adjacent a lateral side of the primary belt; and
- driving the primary belt and the secondary belt at substantially a same speed relative to one another to transport the loose material using the primary belt and the secondary belt.

18. The method of claim 17, further comprising sealing the primary belt and the secondary belt with one or more features on a main surface of the primary belt that engage with the secondary belt.

19. The method of claim 17, further comprising driving another secondary belt with the primary belt and the secondary belt, wherein the another secondary belt positioned adjacent a first lateral side of the primary belt and the secondary belt is positioned adjacent the lateral side of the primary belt opposing the another secondary belt.

20. The method of claim 17, further comprising retaining the secondary belt on a plurality of rollers with a tongue and groove connection.

* * * * *